(12) United States Patent
Huang

(10) Patent No.: US 6,587,247 B2
(45) Date of Patent: Jul. 1, 2003

(54) OPTICAL LENS OF OPTICAL SCANNER

(75) Inventor: Chih-Wen Huang, Hsinchu (TW)

(73) Assignee: Umax Data Systems, Inc., Hsinchu (TW)

( * ) Notice: Subject to any disclaimer, the term of this patent is extended or adjusted under 35 U.S.C. 154(b) by 76 days.

(21) Appl. No.: 09/921,949

(22) Filed: Aug. 3, 2001

(65) Prior Publication Data

US 2002/0186443 A1 Dec. 12, 2002

(51) Int. Cl.[7] ............................................. G02B 26/08
(52) U.S. Cl. ................. 359/215; 359/205; 358/474; 358/483; 399/199
(58) Field of Search ................. 359/205, 215, 359/676, 694–696, 813, 814, 821; 358/474, 483, 494, 496, 497; 399/196, 199–201, 218

(56) References Cited

U.S. PATENT DOCUMENTS 5,576,897 A * 11/1996 Kuo ........................... 359/822
5,883,727 A *  3/1999 Tsai ........................... 358/475

* cited by examiner

Primary Examiner—James Phan
(74) Attorney, Agent, or Firm—J. C. Patents

(57) ABSTRACT

An optical scanner that may assemble the lens design for varying the focus and resolution, having a light source, a reflection compound mirror, a charge coupled device, a basic objective lens and a compound lens. The basic objective lens is designed by simulation software. According to the lens design theory, the compound lens is designed. By incorporating the basic objective lens and the compound lens, different resolutions such as 1200 dpi, 1600 dpi and 2400 dpi of the optical scanner are obtained without redesigning the lens device, the current specification of the optical scanner is also varied.

3 Claims, 11 Drawing Sheets

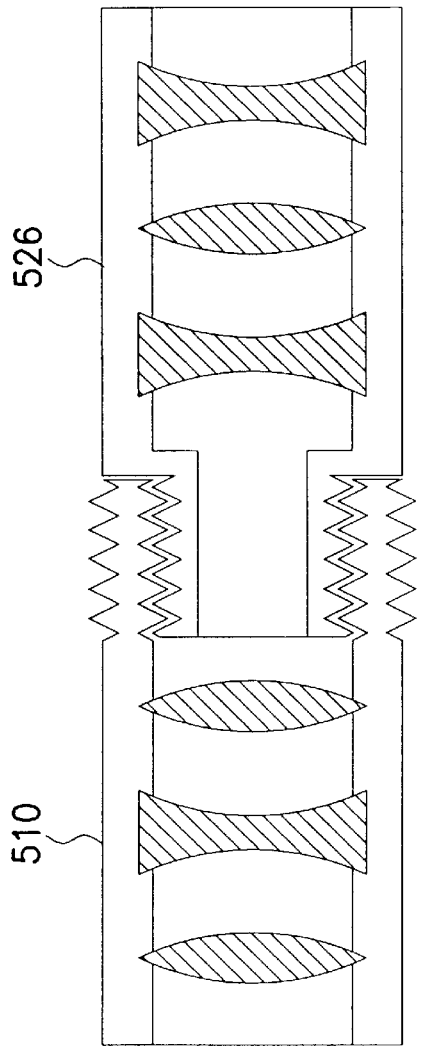
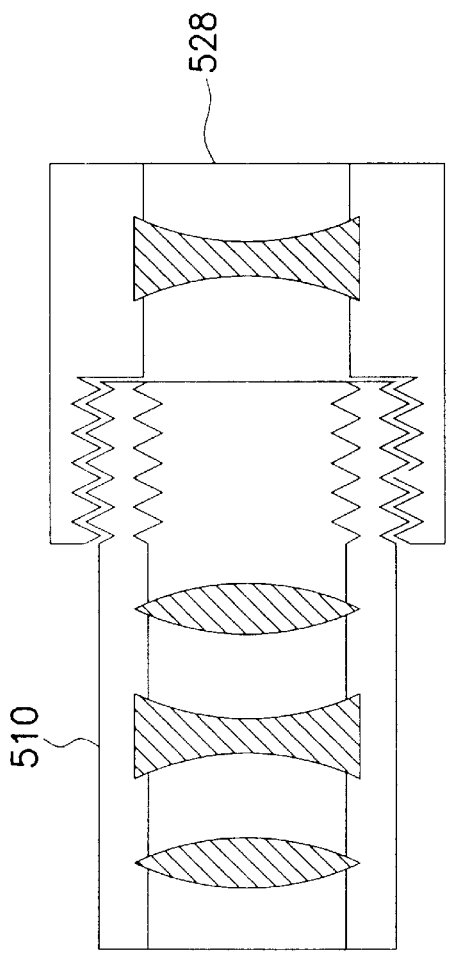

OPTICAL LENS OF OPTICAL SCANNER

BACKGROUND OF THE INVENTION

1. Field of the Invention

The invention relates in general to an optical scanner, and more particularly, to an optical scanner that may assemble different lens designs for changing focus and resolution.

2. Description of the Related Art

The conventional optical scanner (referring to FIG. 1) comprises a light source 100, a reflection compound mirror 400, an object lens 500 and an optical sensor, such as a charge coupled device (CCD) 600. While scanning, the light source 100 radiates on the document 200, an image light is obtained via reflection or transmission. The reflection compound mirror 400 is comprised of several reflection mirrors (401, 402, 403) located along the optical path. Therefore, the image of the document 200 is incident to the reflection compound mirror 400. Being reflected by the reflection compound mirror 400, the image is transmitted to the objective lens 500. The objective lens can receive the image of the document 200 transmitted from the reflection compound mirror 400, and display such image in the charge coupled device 600.

The conventional objective lens is designed by simulation software according to the requirements of resolution, total track (TT), magnification and modulation transfer function (MTF) provided by the client. The factors of lens, material, curvature, number of lenses, size, and length of the objective lens are thus determined. The sample is then fabricated, and the inspection of the sample and simulation are performed. For example, the objective lens 502 of 600 dpi as shown in FIG. 2a is normally formed of three lenses. The objective lens 504 of 1200 dpi as shown in FIG. 2b is normally formed of four lenses.

According to the above, the conventional design of the objective lens has to meet the specification requirements including the resolution, the total track, the magnification and the modulation transfer function. For different specification requirements, a new objective lens has to be designed. Alternatively, the specification of the current optical scanner has to be changed.

SUMMARY OF THE INVENTION

The invention provides an objective compound lens design that may change the focus and resolution without a redesign. By appropriately designing the basic objective lens and incorporating it with various compound lenses, the required resolution and specification can be obtained.

The object compound lens structure may change the focus and resolution of the optical scanner by switching the object lenses.

The objective compound lens can be used in an optical scanner that comprises at least a light source, a reflection compound mirror and an optical sensor. A light source is used to radiate a document to obtain an image light. The objective compound lens is located along the optical path of the image light between the optical sensor and the reflection compound mirror. The object compound lens comprises a basic object lens and at least a compound lens. The compound lens can be adjacent to or detached from the basic objective lens. Or alternatively, more than one compound lens can be installed on a seat and disposed between the basic objective lens and the reflection compound mirror. Via a driving device, the seat can be driven, and the compound lenses on the seat can be incorporated with the basic objective lens.

While connecting the compound lens with the basic objective lens, or incorporating the compound lens with the basic objective lens, the compound lens is located along the optical path of the image light between the basic objective lens and the reflection compound mirror. The optical scanner can thus have different resolutions. Without incorporating the compound lens, the image light can be projected to the optical sensor via the basic objective lens only, so that only a basic resolution is obtained.

Both the foregoing general description and the following detailed description are exemplary and explanatory only and are not restrictive of the invention, as claimed.

BRIEF DESCRIPTION OF THE DRAWINGS

FIGS. 5a to 5d show the basic objective lens assembled with various compound lenses;

DESCRIPTION OF THE PREFERRED EMBODIMENTS

First Embodiment

Figure 1:
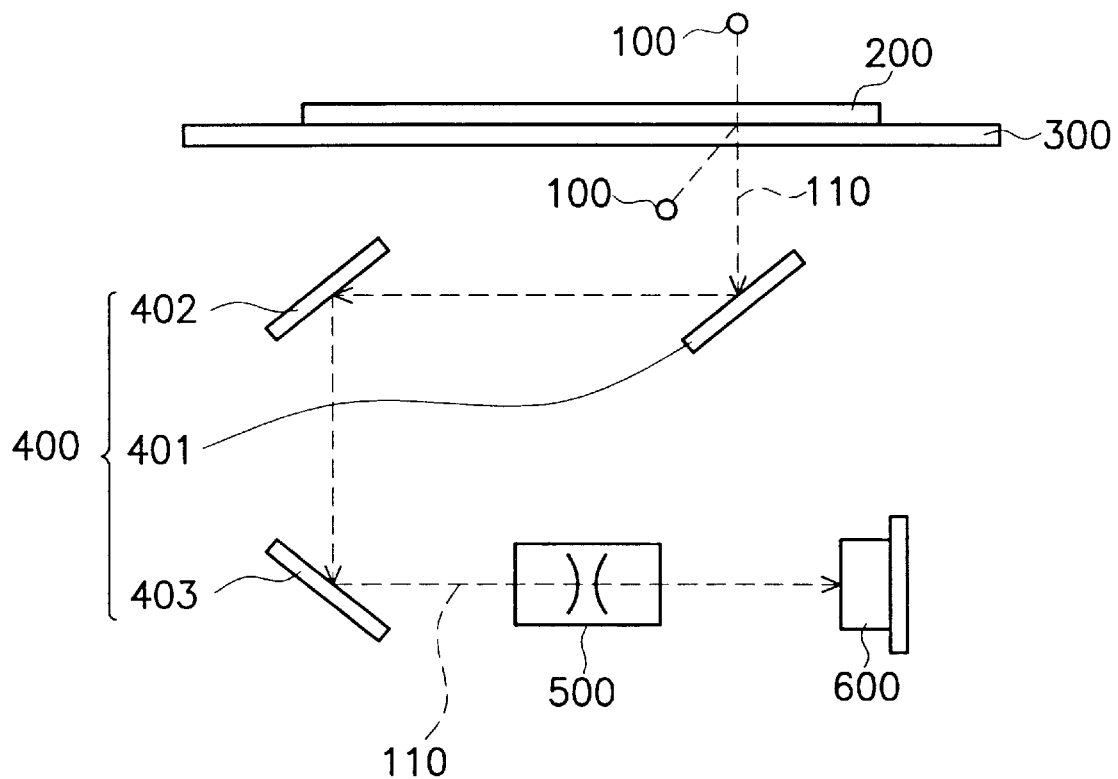
FIG. 1 shows a conventional optical scanner.
Figure 2A:
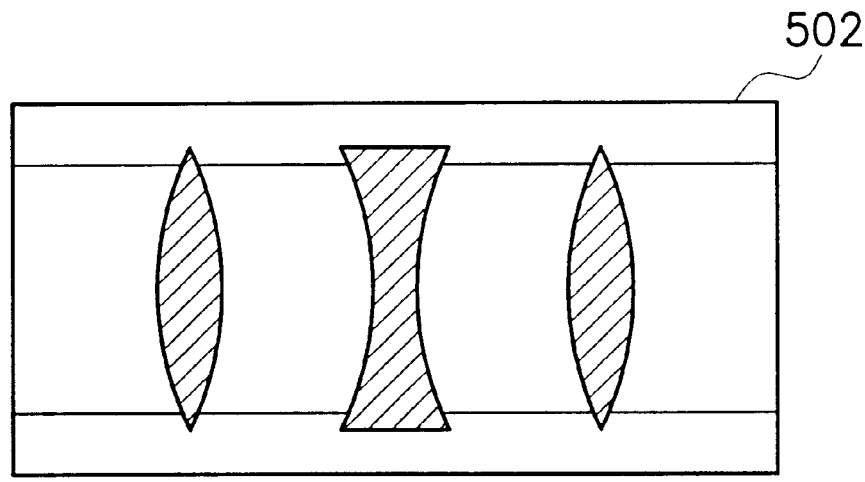
FIGS. 2a to 2b show the conventional objective lens design.
Figure 2B:
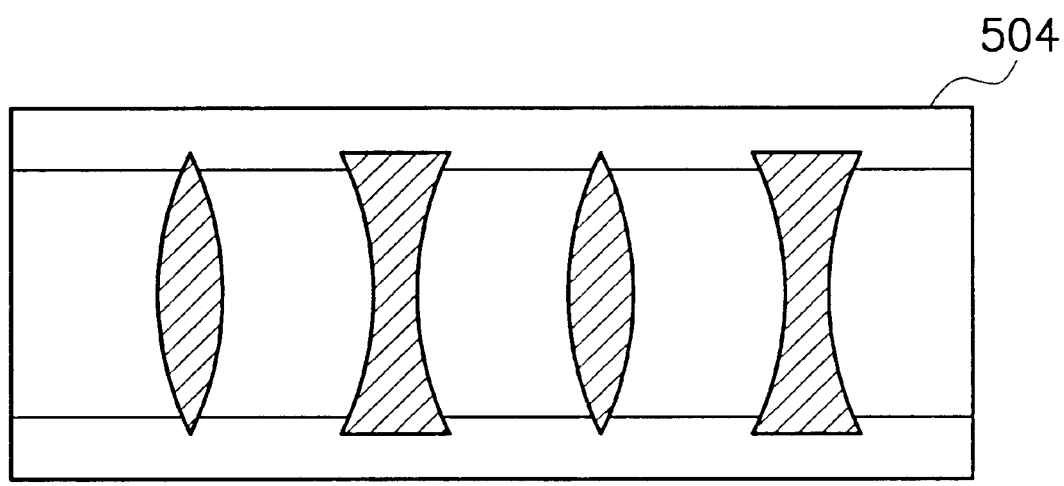
Figure 3:
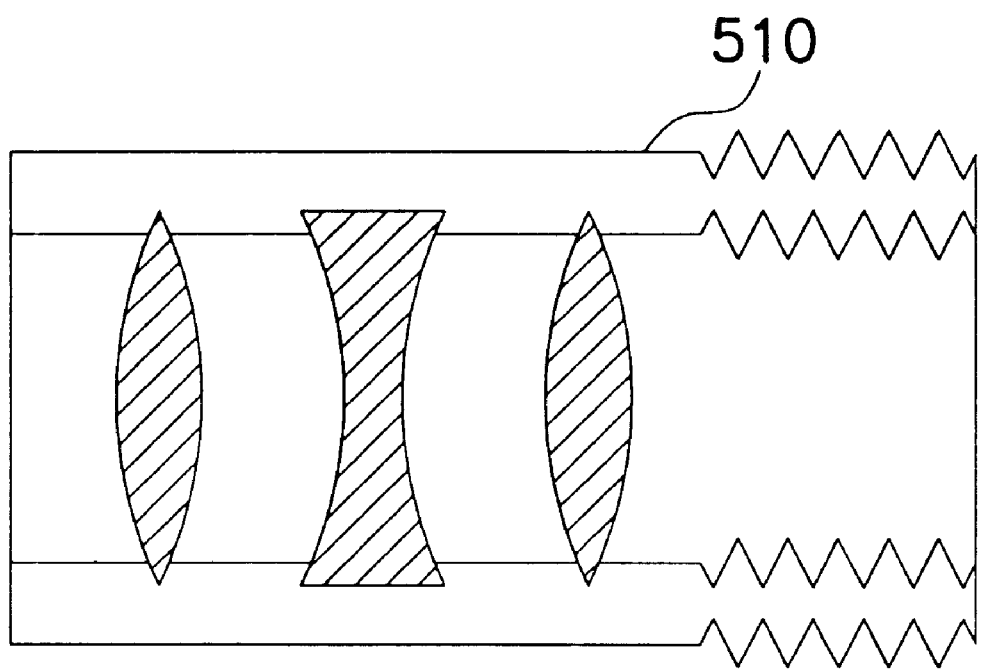
FIG. 3 shows the basic objective lens design of the invention.
Figure 4A:
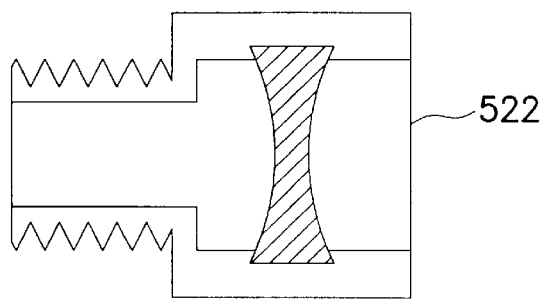
FIGS. 4a to 4d show the compound lenses designed for different resolutions (4a, 4d for 1200 dpi, 4b for 1600 dpi and 4c for 2400 dpi)
Figure 4B:
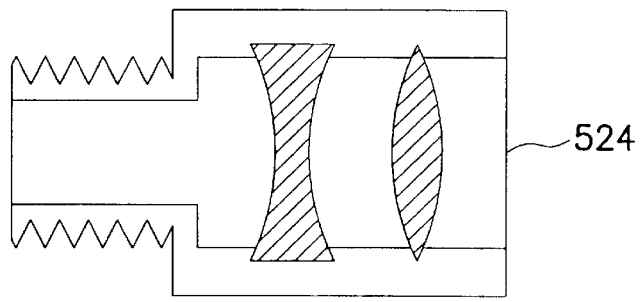
Figure 4C:
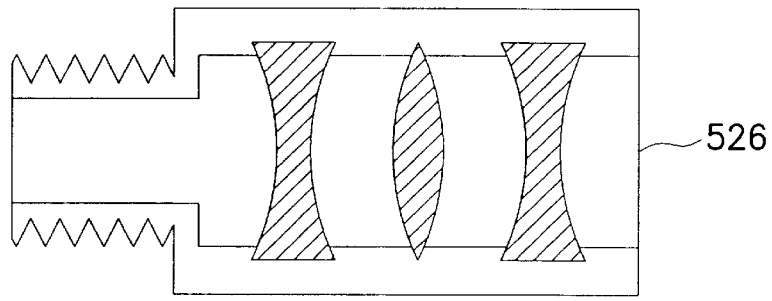
Figure 4D:
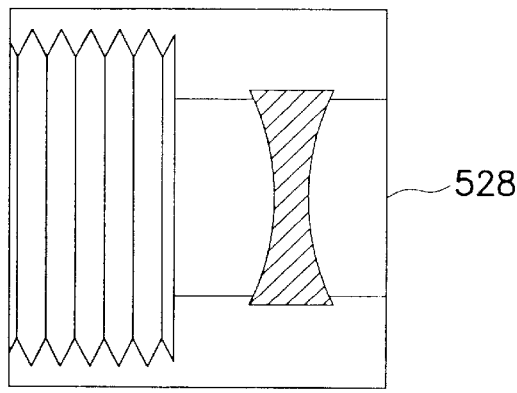
Figure 5A:
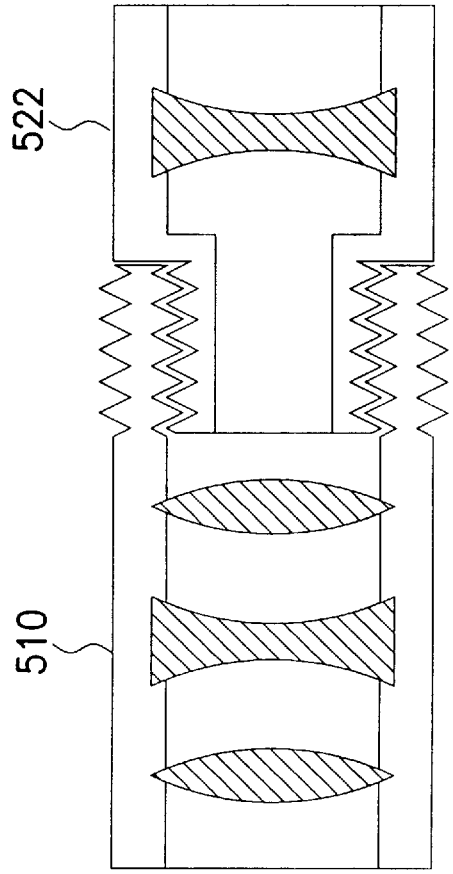
Figure 5B:
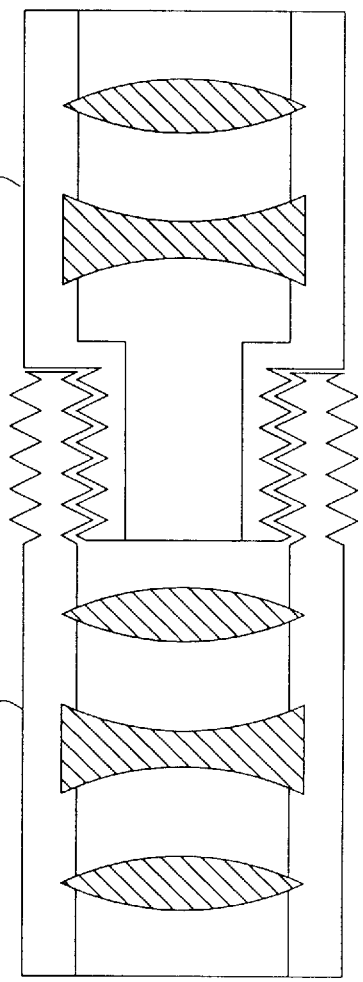
Figure 6:
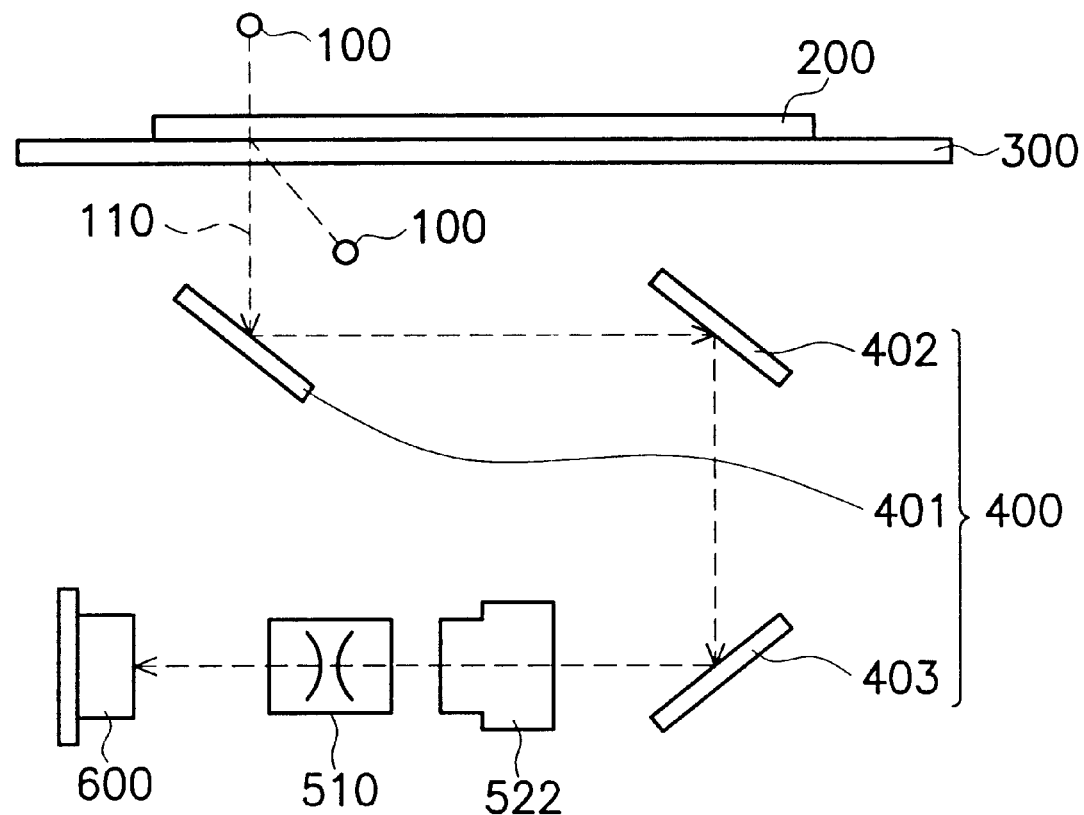
FIG. 6 shows a first embodiment of the invention.

FIG. 6 shows a first embodiment of an optical scanner according to the invention. This embodiment belongs to a contact assembling type. The optical scanner comprises a light source 100, a reflection compound mirror 400, an optical sensor such as a charge coupled device 600, a basic objective lens 510 and a compound lens (522 in this embodiment). In FIG. 3, the basic objective lens 510 is designed by simulation software according to various resolutions such as 600 dpi, 1200 dpi, 1600 dpi and 2400 dpi. The compound lens is selected from compound lens 522, compound lens 524, compound lens 526 and compound lens 528 to meet the required resolution, for example, the compound lens 522 can be selected. As shown in FIGS. 4a, 4b, 4c and 4d, the compound lenses 522 and 528 are selected to meet the resolution 1200 dpi, the compound lens 524 is selected to meet the resolution 1600 dpi, and the compound lens 526 is selected for the resolution 2400 dpi. After assembling the basic objective lens 510 and the compound lens, an objective compound lens that meets the resolution requirement is obtained, as shown in FIGS. 5a (1200 dpi), 5b (1600 dpi), 5c (2400 dpi) and 5d (1200 dpi). In FIG. 3, the compound lens is detachable from the basic objective lens. Via a screw thread (linkage apparatus) inside or outside of the basic objective lens, the compound lens can be connected with the basic object lens. It is appreciated that the skilled person may apply other mechanisms to connect these two lenses. With different resolution requirements, compound lenses with different resolutions can be changed without redesigning the whole objective compound lens. In addition, the additionally applied compound lens is located at the optical path of an image light 110 between the basic objective lens 510 and the reflection compound mirror 400. The basic objective lens 510 can also be used independently to result in a basic resolution (600 dpi) of the image light 110 projected to the optical sensor 600.

Second Embodiment

Figure 7A:
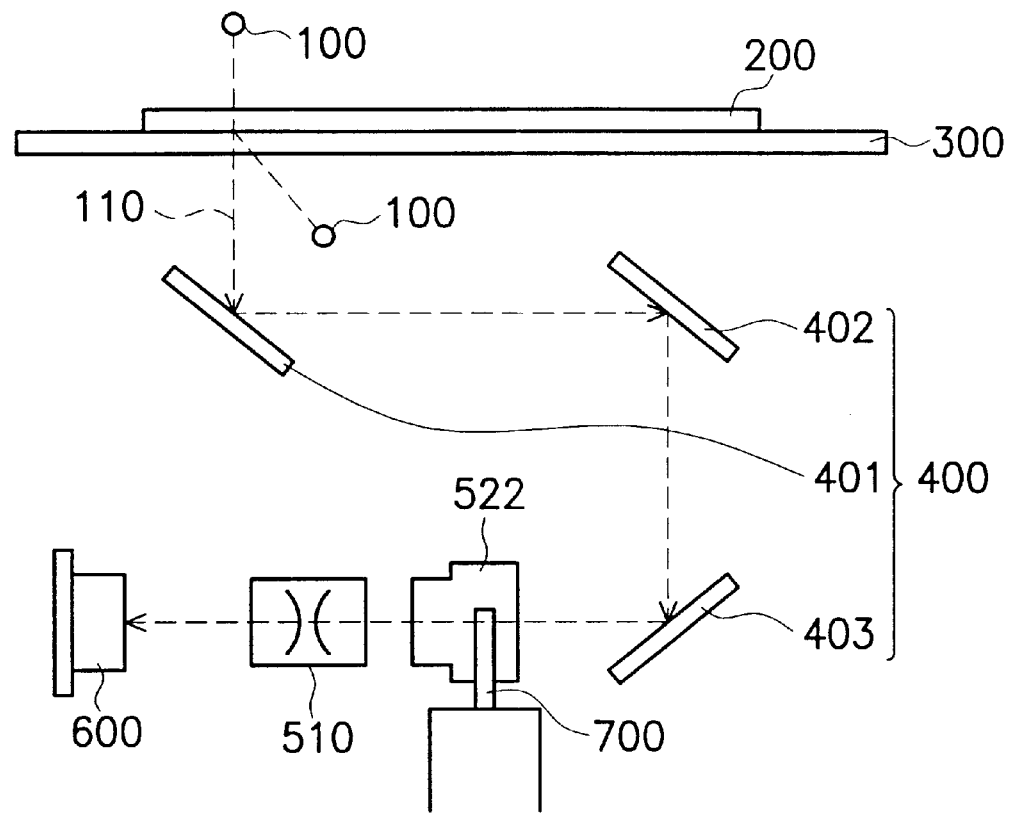
FIG. 7a shows a second embodiment of the invention.
Figure 7B:
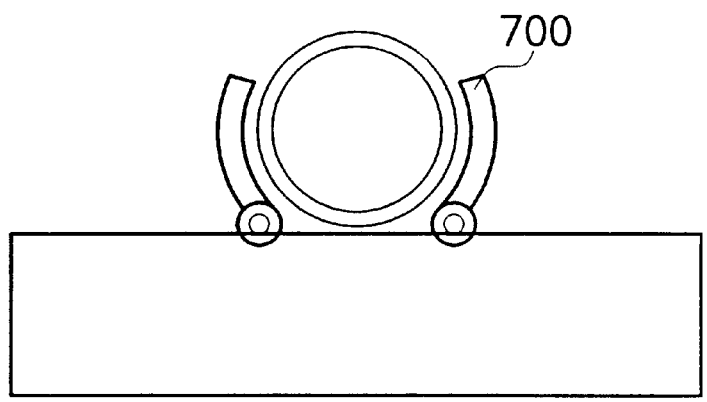
FIG. 7b shows a fixed seat used in the second embodiment.

In FIG. 7a, a second embodiment of an optical scanner is illustrated. The embodiment is a non-contact assembling type. The optical scanner comprises a light source 100, a reflection compound mirror 400, an optical sensor such as a charge coupled device 600, a basic objective lens 510, a compound lens (522 in this embodiment) and a mounting seat 700. The basic objective lens 510 is designed by simulation software to meet the resolution requirement (such as 600 dpi) and other resolution requirements such as 1200 dpi, 1600 dpi and 2400 dpi. The compound lens is selected from the compound lenses 520 to meet the specific resolution requirement. For example, the compound lens 522 is selected. The compound lens 522 is mounted on the mounting seat 700 as shown in FIG. 7b. Each objective lens is incorporated to meet different resolution requirements. By incorporating the basic objective lens with different compound lenses, various resolution requirements can be met without redesigning the whole objective compound lens.

Figure 8A:
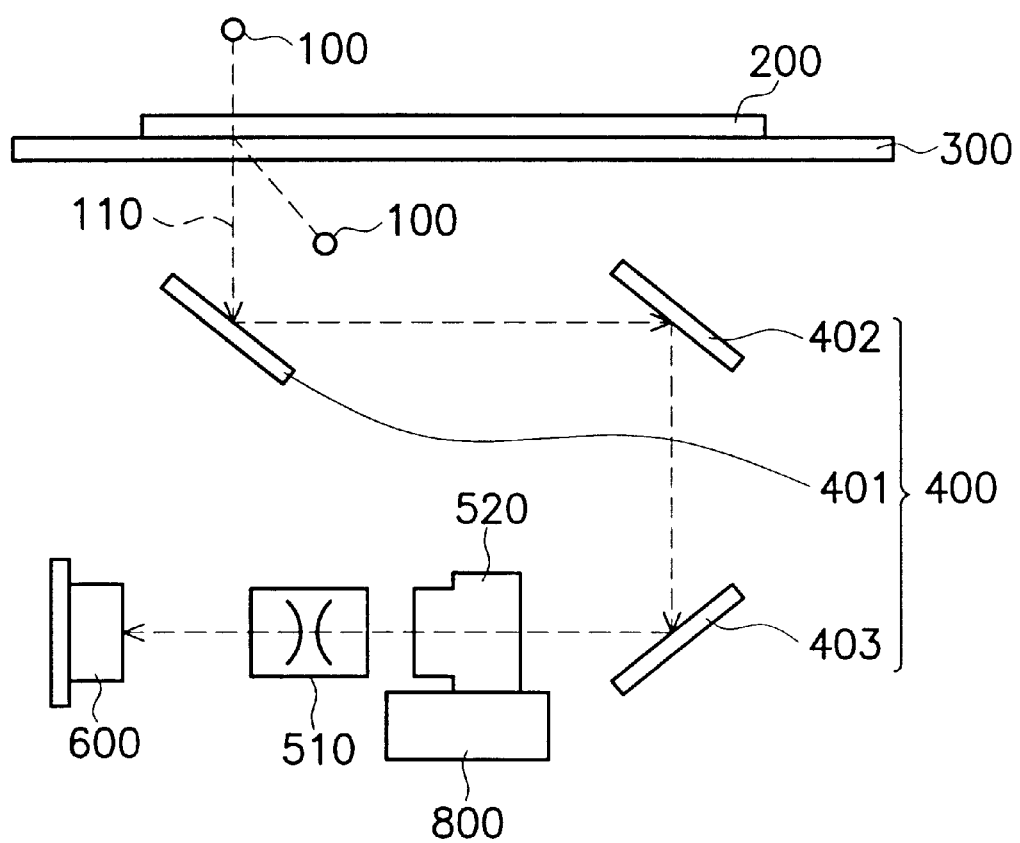
FIG. 8a shows a third embodiment of the invention.
Figure 8B:
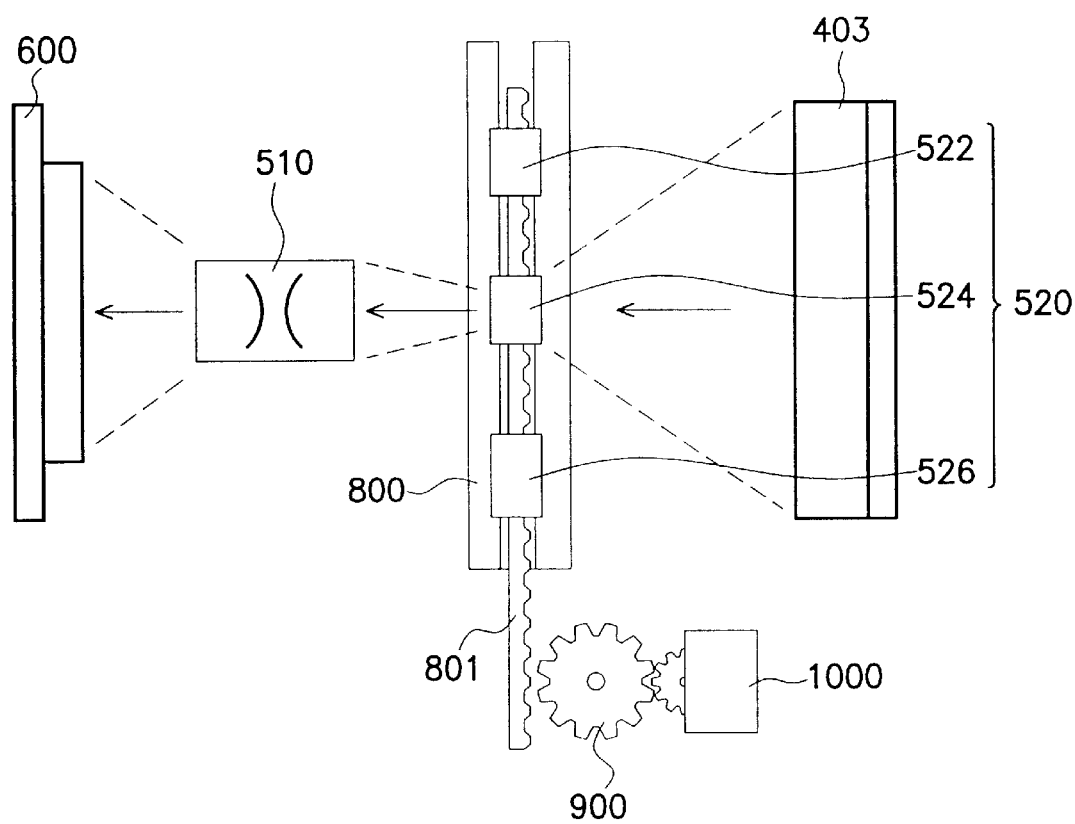
FIG. 8b sows the linear seat used in the third embodiment of the invention.
Figure 8C:
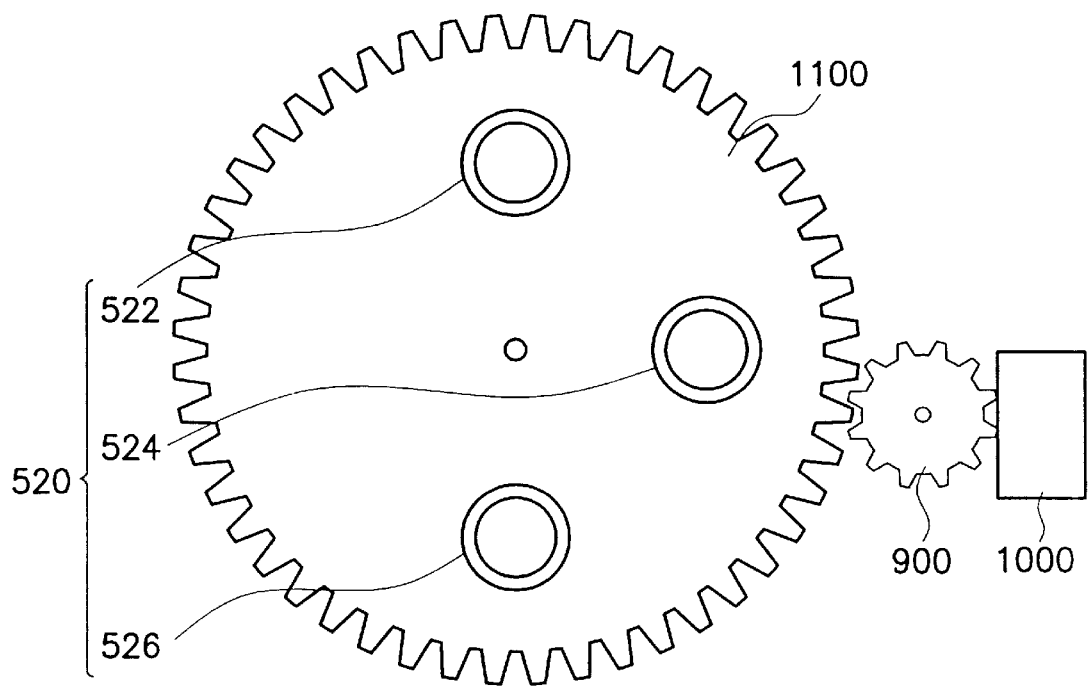
FIG. 8c shows the disk-like seat used in the third embodiment.

In FIG. 8a, a third embodiment of an optical scanner is illustrated. The embodiment is a non-contact assembling type. The optical scanner comprises a light source 100, a reflection compound mirror 400, an optical sensor such as a charge coupled device 600, a basic objective lens 510, a compound lens 520, a seat 800, a gearing and a driver. The basic objective lens 510 is designed by simulation software to meet the resolution requirement (such as 600 dpi) and other resolution requirements such as 1200 dpi, 1600 dpi and 2400 dpi. Various compound lenses 522, 524 and 526 are included in the compound lenses 520 to meet different resolution requirements (1200 dpi, 1600 dpi, 2400 dpi). The compound lenses 522, 524 and 526 are arranged and mounted on a gear strip 801 of the seat 800 as shown in FIG. 8b. The gear strip 801 is driven by the gearing to shift linearly. To switch between different resolutions, a motor 1000 drives the gearing 900 according to a firmware command to drive the compound lens 520 on the seat, until the compound lens meeting the resolution requirement is selected. In FIG. 8c, the seat 800 that switches the compound lens linearly is replaced with a rotation disk 1100. The compound lenses 522, 524 and 526 are evenly distributed on the perimeter of the disk 1100 with the same distance to the center of the disk 1100. While switching between different resolutions, firmware can be used to command the motor 100 to drive the gearing 900 to rotate the seat 1100, so that the compound lens that meets the resolution requirement is selected. By incorporating the objective lens with the compound lens, various objective compound lenses to meet different resolution requirements are obtained. The gearing is selected from a group consisting of gear strips, gear, lead screw, steel tape, belt and a combination of the above.

Accordingly, the invention comprises at least the following advantages:

(1) The objective lens design of the scanner is modularized. According to different resolutions, magnifications, optical lengths and image quality requirements, a compound lens is incorporated without redesigning the objective lens or changing the current scanner design. The reuse rate of the scanner is also increased.

(2) In the objective lens design provided by the invention, the basic objective lens has a constant form, so that it can be reused for different resolution requirements. The design cost is reduced, and the redefine and lens simulation required by changing lens design are also avoided.

(3) The compound lens in the first and second embodiment can be adjusted by the user without effecting a major adjustment of the system. In the third embodiment, the compound lens is automatically changed according to the resolution required by user. The optical scanner is upgraded for having different optical resolutions.

(4) The design of the compound lens can be switched for various resolutions, so that the design cost of the objective lens is decreased.

(5) The compound lens can be adjusted according to the image requirement of the customers.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An objective compound lens, applied to an optical scanner having at least a light source, a reflection compound mirror and an optical sensor, wherein the light source is used to radiate a document to obtain an image light, the reflection compound mirror is located in an optical path of the image light to project the image light on the optical sensor, and the objective compound lens is located between the optical path of the image light between the optical sensor and the reflection compound mirror, the objective compound lens comprising:

a basic objective lens having a first linkage, and a plurality of compound lenses having corresponding second linkage respectively, wherein any one of the second linkages is suitable for connecting and detaching with the basic objective lens via the first linkage;

wherein when the basic objective lens is coupled to one of the selected compound lens located on the optical path of the image light between the basic objective lens and the reflection compound mirror, the optical scanner has a resolution corresponding to the selected compound lens, and when any one of the compound lenses is not connected to the basic objective lens, the image light is projected on the optical sensor via the basic object lens only.

2. The objective compound lens according to claim 1, wherein the first linkage comprises a screw thread, and wherein the second linkage also comprises a screw corresponding to the screw thread of the first linkage.

3. The optical compound lens according to claim 1, wherein the second linkage of the compound lens can be capped to the first linkage.

* * * * *